United States Patent
Black

(10) Patent No.: US 10,242,674 B2
(45) Date of Patent: Mar. 26, 2019

(54) PASSIVE WORD DETECTION WITH SOUND EFFECTS

(71) Applicant: Sony Interactive Entertainment Inc., Tokyo (JP)

(72) Inventor: Glenn Black, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/677,518

(22) Filed: Aug. 15, 2017

(65) Prior Publication Data
US 2019/0057688 A1    Feb. 21, 2019

(51) Int. Cl.
| | | |
|---|---|---|
| G10L 15/22 | (2006.01) | |
| G10L 15/06 | (2013.01) | |
| G10L 17/00 | (2013.01) | |
| G06F 3/16 | (2006.01) | |
| G06F 17/30 | (2006.01) | |
| G06N 99/00 | (2019.01) | |

(52) U.S. Cl.
CPC .............. *G10L 15/22* (2013.01); *G06F 3/162* (2013.01); *G06F 17/30386* (2013.01); *G06N 99/005* (2013.01); *G10L 15/063* (2013.01); *G10L 17/00* (2013.01)

(58) Field of Classification Search
CPC ...................................................... G10L 15/22
USPC ......................................... 704/231, 270, 275
See application file for complete search history.

(56) References Cited

U.S. PATENT DOCUMENTS

| | | | | |
|---|---|---|---|---|
| 5,987,415 A | * | 11/1999 | Breese | G10L 17/26 704/270 |
| 6,324,511 B1 | * | 11/2001 | Kiraly | G09B 21/006 704/260 |
| 6,334,104 B1 | * | 12/2001 | Hirai | G10L 13/047 463/40 |
| 6,728,679 B1 | * | 4/2004 | Strubbe | G06F 3/011 704/270.1 |
| 6,816,577 B2 | * | 11/2004 | Logan | H04M 1/274575 379/67.1 |
| 6,975,988 B1 | * | 12/2005 | Roth | G06Q 10/107 345/184 |
| 7,644,000 B1 | * | 1/2010 | Strom | G10L 15/26 704/251 |
| 9,253,560 B2 | * | 2/2016 | Goldstein | G06F 17/30743 |

(Continued)

*Primary Examiner* — Shaun Roberts
(74) *Attorney, Agent, or Firm* — Carr & Ferrell LLP

(57) ABSTRACT

A system, method, and processor-readable storage medium for providing sound effects are disclosed. An example method comprises receiving an audio signal associated with a speech of a user, performing speech recognition on the audio signal to identify one or more recognized words, identifying at least one trigger word among the one or more recognized words, and providing to the user at least one sound effect associated with the at least one trigger word. The speech recognition can be implemented by a trained machine-learning system. The sound effects can be provided to the user and optionally to other users, for example, via a network gaming environment. The sound effects can also be adjusted or selected based on a conversational context, user identification, and/or audio characteristics of the received audio signal. The system for providing sound effects can include a smart speaker, mobile device, game console, television device, and the like.

20 Claims, 3 Drawing Sheets

(56) References Cited

U.S. PATENT DOCUMENTS

| | | | |
|---|---|---|---|
| 2002/0191757 A1* | 12/2002 | Belrose | G09B 21/006 379/88.13 |
| 2004/0193420 A1* | 9/2004 | Kennewick | G06F 17/30654 704/257 |
| 2007/0021145 A1* | 1/2007 | Lam | H04M 1/72563 455/556.1 |
| 2009/0192637 A1* | 7/2009 | Picunko | H04H 20/103 700/94 |
| 2010/0069148 A1* | 3/2010 | Cargill | A63B 71/0622 463/25 |
| 2013/0030814 A1* | 1/2013 | Rajput | G10L 25/60 704/275 |
| 2014/0258858 A1* | 9/2014 | Hwang | G09B 5/062 715/716 |

* cited by examiner

PASSIVE WORD DETECTION WITH SOUND EFFECTS

BACKGROUND

Technical Field

This disclosure generally relates to speech recognition in gaming and entertainment applications. More particularly, this disclosure relates to a technology for passive monitoring of user speech and providing sound effects when certain trigger words are detected in the user speech.

Background

Technologies directed to improving user game experiences are constantly evolving. For example, users can play a large number of games including tabletop games, board games, card games, dice games, video games, computer games, network games, online games, multiplayer games, virtual reality games, role-playing games, simulation games, business games, and so forth. Some computerized games can provide users with certain visual and audio feedback based on certain events occurring during gameplay. For example, when a user strikes a virtual character in a computer game, the gaming device can generate a certain visual and/or audio effect to accompany that activity by the user in order to enhance the user gaming experience. This visual and/or audio effect does not depend on what is being said by the user while playing the game. As such, there is a need for the enhancement of the audio experience of the user based on events occurring outside a gaming environment (e.g., to enhance the conversational experience of two or more individuals playing the game).

SUMMARY

This section is provided to introduce a selection of concepts in a simplified form that is further described below in the Detailed Description section. This summary is not intended to identify key features or essential features of the claimed subject matter, nor is it intended to be used as an aid in determining the scope of the claimed subject matter.

In one example embodiment of this disclosure, there is provided a method for providing sound effects. An example method comprises: receiving an audio signal associated with a speech of a user, performing speech recognition on the audio signal to identify one or more recognized words, identifying at least one trigger word among the one or more recognized words, and providing to the user at least one sound effect associated with the at least one trigger word.

In another embodiment of this disclosure, there is provided a system for providing sound effects. An example system comprises at least one processor and a memory storing processor-executable codes. The processor is configured to implement the above-outlined method for providing sound effects upon executing the processor-executable codes.

In yet another embodiment of this disclosure, there is provided a non-transitory processor-readable medium having instructions stored thereon, which when executed by one or more processors, cause the one or more processors to implement the above-outlined method for providing sound effects.

Additional novel features of the example embodiments can be set forth in the detailed description, which follows, and can be apparent to those skilled in the art upon examination of the following description and the accompanying drawings or may be learned by production or operation of the examples. The objectives and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

Figure 1:
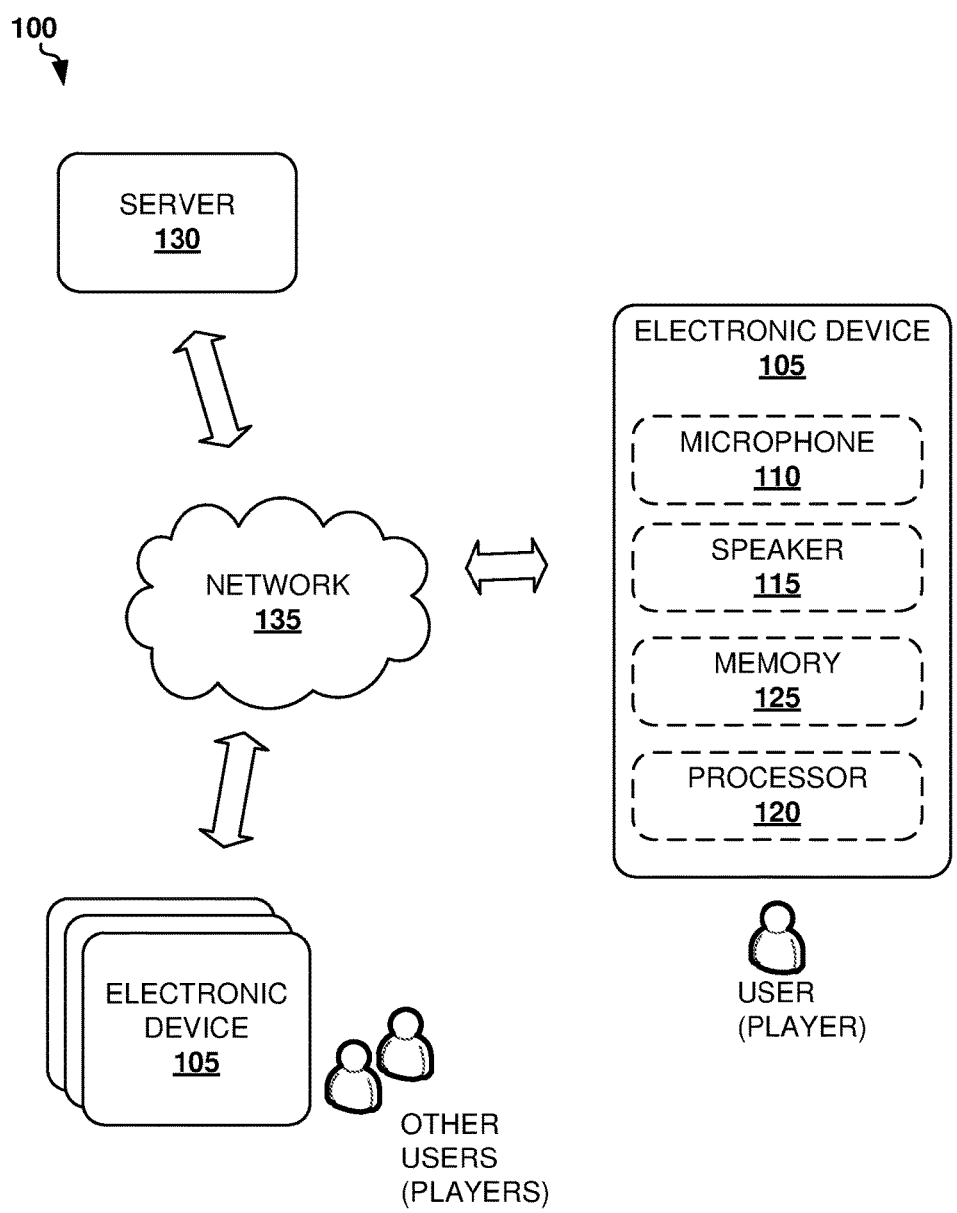
FIG. 1 shows an example system architecture for providing sound effects, according to one embodiment.

Like reference characters indicate similar components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. In addition, common but well-understood elements that are useful or common in a commercially feasible embodiment are often not depicted in order to facilitate a less obstructed view of these various embodiments of the present disclosure.

DETAILED DESCRIPTION OF EXAMPLE EMBODIMENTS

The present disclosure is generally directed to a technology for providing sound effects in response to the detection of certain trigger words that are spoken by a user. The technology is directed toward improving a gaming experience, including both computerized gaming experiences and tabletop gaming experiences, and to address other differences and drawbacks known in the art.

The trigger words can be detected by passive "listening" to user speech and performing speech recognition on the user speech using a machine-learning system. Any words recognized by the speech recognition technology are matched to a database of predetermined trigger words, and if a match is found, a sound effect associated with the matched trigger word is played or otherwise provided to the user. For example, when the user says, "Boom," the technology can recognize the spoken trigger word and play an explosion sound immediately after or substantially concurrent (e.g., within about one second) with the spoken trigger word. The sound effects provided can include a wide range of sounds, music, melodies, songs, and the like, which can be selected or adjusted by the user. Moreover, in some implementations, the sound effects can be supplemented with certain visual effects.

The machine-learning system can be trained to identify a conversational context based on two or more spoken words to improve accuracy of the speech recognition and identification of the trigger words. In certain embodiments, the conversational context can be helpful to distinguish a meaning of certain target words as implied by the user. For example, if a user says, "I did it!" in the context of an accomplishment, a sound effect commonly associated with celebration (e.g., applause) can be played. However, if this phrase is spoken in a different conversational context (e.g., in a sarcastic way), a sound effect typically associated with failure (e.g., "sad trombone") can be provided. Alternatively, no sound effect can be played.

The machine-learning system can also be trained to provide voice recognition and identify users such that settings of identified users are used in providing sound effects. As such, the users can predetermine what sound effects are to be provided (as well as how they are provided) in response to the recognition of certain trigger words. For example, when a first user says "I won," a first sound effect (such as a party horn sound effect) can be provided, but when a second user says "I won," a second sound effect (such as a short victory song) can be played. The first sound effect can be different from the second sound effect. In other embodiments, when the first user says "I won," a sound effect (e.g., a party horn sound effect) can be played with first audio parameters, and when the second user says "I won," the same sound effect can be played, but using second audio parameters (e.g., the sound effect for the second user being louder than that for the first user). In other words, the sound effect can be adjusted and played differently depending on the user providing the trigger word.

In yet additional embodiments, audio characteristics of user speech can also be determined and used for selecting and adjusting sound effects. More specifically, a tonality, loudness, frequency, pitch, or any audio characteristics of user speech can be detected such that sound effects are modified in accordance with the detected audio characteristics of user speech. For example, when a user says a certain trigger word quietly, a corresponding sound effect is played quietly as well. However, when the user says the same trigger word loudly, the sound effect is also played loudly. In yet additional embodiments, a sound effect matching a certain trigger word can be selected from several sound effects based on the determined audio characteristics of user speech.

The sound effects can also be provided or played on multiple devices for a plurality of users. For example, sound effects can be provided to players in an online game or network game, where the players are also involved in an online chat. In these implementations, sound effects provided to a user who spoke a corresponding trigger word can differ from sound effects provided to other users in the online chat. For example, for other users, the trigger words in the user speech can be filtered or adjusted in addition to the corresponding sound effects. In another example, for said other users, the trigger words in the user speech can be completely filtered out and the corresponding sound effects can be provided instead of (i.e., in place of) the spoken words. In other words, the technology can substitute certain spoken words by one user with corresponding sound effects such as that other users will hear everything that the user said except for the trigger word, which is replaced with the corresponding sound effect.

The technology described herein can be implemented with a wide range of electronic devices. For example, a smart speaker or wireless speaker can be used. In other implementations, a listening device or microphone can be used. In yet other embodiments, a mobile device, such as a cellular phone, a smart phone, or a tablet computer, can be used to implement at least some operations of the technology. Moreover, other devices can be used such as a desktop computer, laptop computer, workstation, multimedia device, television device, smart television device, in-vehicle computer, game console, gaming device, and the like.

Note that the instant technology can be also implemented using distributed systems, including "cloud" computing. For example, a user device, such as a smart speaker or mobile device, can be configured to receive user speech, generate an audio signal, and then transmit the same to a server for performing speech recognition and identifying trigger words. When the server detects trigger words, the server sends certain identifiers concerning the trigger words to the user device to playback sound effects corresponding to the identifiers.

In yet additional implementations, a system suitable for implementing this technology can include a first user device, which is configured to implement some of operations of the present technology, and a second user device, which is configured to implement other operations of the present technology. For example, a first user device (e.g., a mobile phone or game console) can acquire user speech, perform recognition on the user speech, identify trigger words, and identify corresponding sound effects. However, the sound effects are played by a second user device such as a television device or a multimedia station.

The following detailed description of embodiments includes references to the accompanying drawings, which form a part of the detailed description. Approaches described in this section are not prior art to the claims and are not admitted to be prior art by inclusion in this section. Reference throughout this specification to "one embodiment," "an embodiment," "some embodiments," "some implementations" or similar language means that a particular feature, structure, or characteristic described in connection with an example implementation is included in at least one embodiment of the present disclosure. Thus, appearances of the phrases "in one embodiment," "in an embodiment," "in some embodiments," and similar language throughout this specification may, but do not necessarily, all refer to the same embodiment.

Furthermore, the described features, structures, or characteristics of embodiments may be combined in any suitable manner in one or more implementations. In the description, numerous specific details are provided, such as examples of programming, software modules, user selections, network transactions, hardware modules, hardware circuits, hardware chips, and the like, to provide a thorough understanding of embodiments. One skilled in the relevant art will recognize, however, that the embodiments can be practiced without one or more of the specific details, or with other methods, components, materials, and so forth. In other instances, well-known structures, materials, or operations are not shown or described in detail to avoid obscuring aspects of the disclosure.

Embodiments of this disclosure will now be presented with reference to accompanying drawings which show blocks, components, circuits, steps, operations, processes, algorithms, and the like, collectively referred to as "elements" for simplicity. These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, Central Processing Units (CPUs), digital signal processors (DSPs), field programmable gate arrays (FPGAs), programmable logic devices (PLDs), state machines, gated logic, discrete hardware circuits, and other suitable hardware configured to perform various functions described throughout this disclosure. One or more processors in the processing system may execute software, firmware, or middleware (collectively referred to as "software"). The term "software" shall be construed broadly to mean processor-executable instructions, instruction sets, code segments, program code, programs, subprograms, software components, applications, software applications, software packages, routines, subroutines, objects, executables, threads of execution, procedures, functions, and the like, whether referred to as software, firmware, middleware, microcode, hardware description language, or otherwise.

Accordingly, in one or more embodiments, the functions described herein may be implemented in hardware, software, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage, solid state memory, or any other data storage devices, combinations of the aforementioned types of computer-readable media, or any other medium that can be used to store computer executable code in the form of instructions or data structures that can be accessed by a computer.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

The term "audio signal" shall be construed to mean any type of signal comprising or representing audio or acoustic information. For example, an acoustic wave can be an audio signal that can be detected by a microphone. In another example, an audio signal can be an analog or digital signal generated by a microphone in response to receiving the acoustic wave. In yet other implementations, the audio signal can encompass digital data characterizing the acoustic wave (e.g., a user voice or user speech).

The term "sound effect" shall be construed to mean a sound, music, melody, song, sound clip, recorded speech, human voice, stock sound, or sound sample (e.g., laughter, door opening, glass breaking, pieces played on a musical instrument, drum roll), or any combinations thereof. Also, the sound effect may include sound clips that are placed on top of other sounds so as to produce a "layered sound effect." Sound effects can be stored in a database, and users can upload or select sound effects. Users can also adjust parameters of sound effects (e.g., tonality, amplitude, etc.). Sound effects can be also created by users and shared with other users.

The term "trigger word" can also mean a "key word" or another predetermined word, phrase, or sentence. Trigger words can be saved in a database. Moreover, each trigger word can be associated with one or more sound effects. Similarly, a sound effect in the database can be associated with one or more trigger words.

The terms "user" and "player" can be used interchangeably and mean a person who uses or participates in the methods for providing sound effects as described herein.

The term "conversational context" may be construed to mean some or all circumstances under which a trigger word was spoken or provided.

The terms "multiplayer computerized game environment" or game environment" can be construed to mean a virtual or networked environment in which players (users) participate in game actions, progress through a storyline, and interact with one another, game characters, entities, or objects of computerized game. Computerized games can include video games, computer games, network games, online games, multiplayer games, virtual reality games, role-playing games, and the like. In some embodiments, users can have an ability to chat or speak with one another within the multiplayer computerized game environment.

Referring now to the drawings, example embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1 shows an example system architecture 100 for providing sound effects, according to one example embodiment. System architecture 100 includes an electronic device 105 such as a listening device, wireless speaker, smart speaker, mobile device, cellular phone, smart phone, tablet computer, desktop computer, laptop computer, workstation, multimedia device, television device, smart television device, in-vehicle computer, game console, gaming device, and the like. As such, electronic device 105 may include a microphone 110 to capture a user speech and provide an audio signal representing the user speech. Electronic device 105 may also include a speaker 115 configured to output (play) various sounds, music, speech, and sound effects. Electronic device 105 may also include a processor 120 and a memory 125. Memory 125 can store processor-executable instructions for execution by processor 120. Memory 125 can also store sound effects, user settings associated with providing sound effects, a database of trigger words corresponding to sound effects, and so forth. The processor-executable instructions can cause processor 120 to implement at least some operations of the methods for providing sound effects as disclosed herein. Electronic device 105 may further include a user interface, such as a graphical user interface, enabling the user to activate or deactivate the method for providing sound effects and adjust settings associated with sound effects, as well as to create, adjust, delete, upload, or download sound effects.

In some embodiments, the user of electronic device 105 can be engaged into playing an online (network) game with users (players), which use similar or same electronic devices 105, such that these users are within the same multiplayer computerized game environment. In addition, the user of electronic device 105 can have a conversational chat with said other users. The chat can imply electronically transmitting user speech from one electronic device 105 to another.

As such, the interaction and data transfer can be implemented via at least one server 130 and a communications network 135. Communications network 135 can refer to any wired, wireless, or optical networks including, for example, the Internet, intranet, local area network (LAN), Personal Area Network (PAN), Wide Area Network (WAN), Virtual Private Network (VPN), cellular phone networks (e.g., packet switching communications network, circuit switching communications network), Bluetooth radio, Ethernet network, an IEEE 802.11-based radio frequency network, IP communications network, or any other data communication network utilizing physical layers, link layer capability, or network layer to carry data packets, or any combinations of the above-listed data networks.

In some implementations, server 130 can implement certain operations of the methods for providing sound effects as described herein. For example, electronic device 105 can generate an audio signal by microphone 110 and optionally perform some pre-processing. The audio signal can be optionally sent to server 130 for performing speech recognition and identifying if any trigger words are present in the audio signal. If trigger words are detected by server 130, server 130 can instruct or cause electronic device 105 to play a sound effect corresponding to the identified trigger word via speaker 115.

In other implementations, however, all operations of the method for providing sound effects are implemented by electronic device 105. However, it is not necessary that electronic device 105 is incorporated into a single housing. Rather, in some implementations, electronic device 105 can include several units. For example, microphone 110, processor 120, and memory 125 can be in a smart phone, while speaker 115 can be in a television set, the smart phone and the television set operatively connected to one another.

Figure 2:
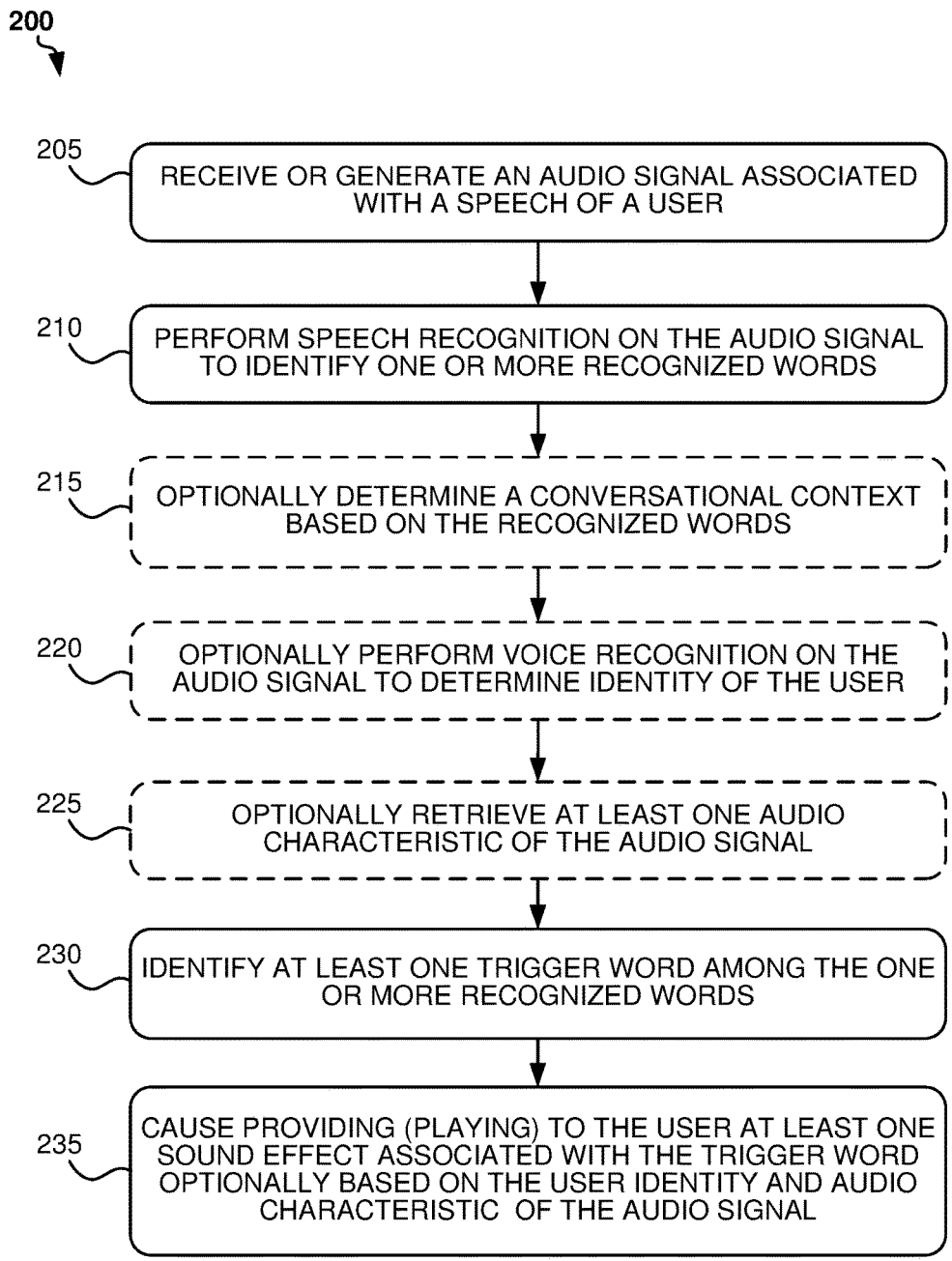
FIG. 2 shows a process flow diagram illustrating a method for providing sound effects, according to an example embodiment.

FIG. 2 is a process flow diagram showing a method 200 for providing sound effects, according to an example embodiment. Method 200 may be performed by processing logic that may include hardware (e.g., decision-making logic, dedicated logic, programmable logic, application-specific integrated circuit (ASIC)), software (such as software run on a general-purpose computer system or a dedicated machine), or a combination of both. In one example embodiment, the processing logic refers to one or more elements of electronic device 105 of FIG. 1. Below recited operations of method 200 may be implemented in an order different than described and shown in the figure. Moreover, method 200 may have additional operations not shown herein, but which can be evident for those skilled in the art from the present disclosure. Method 200 may also have fewer operations than outlined below and shown in FIG. 2.

At operation 205, electronic device 105 receives or generates an audio signal associated with a speech of a user. For example, the audio signal can be generated by microphone 110.

At operation 210, electronic device 105 (or server 130) performs speech recognition on the audio signal to identify one or more recognized words.

At optional operation 215, electronic device 105 (or server 130) determines a conversational context based on the one or more recognized words.

At optional operation 220, electronic device 105 (or server 130) performs voice recognition on the audio signal to determine the identity of the user among a plurality of users.

At optional operation 225, electronic device 105 (or server 130) retrieves at least one audio characteristic of the audio signal associated with the speech of the user. The audio characteristic of the audio signal can include a tonality or a loudness of the speech of the user, although any other audio characteristics can be also used.

At operation 230, electronic device 105 (or server 130) identifies at least one trigger word among the one or more recognized words. The trigger words can be predetermined by the user or a system administrator. The identification of trigger words can employ dynamic searching of a database for each of the recognized words directed to find a match with at least one trigger word. The database can reside at electronic device 105 or server 130. Each trigger word can correspond to one or more predetermined sound effects.

In certain embodiments, the identification of the trigger words among the recognized words further depends on the conversational context determined at operation 215.

In some embodiments, a machine-learning system can be used to perform the speech recognition on the audio signal (operation 210) to identify the one or more recognized words and to identify certain trigger words among the recognized words (operation 230). The machine-learning system can also be used to determine the conversational context surrounding recognized trigger words. The machine-learning system can also be used to perform voice recognition and identify the user.

Generally, a machine-learning system (or neural network) employs one or more layers, including an input layer, an output layer, and one or more hidden layers. At each layer (except the input layer), an input value is transformed in a non-linear manner to generate a new representation of the input value. The output of each hidden layer is used as an input to the next layer in the network (i.e., the next hidden layer or the output layer). Each layer of the network generates an output from a received input in accordance with current values of a respective set of parameters.

The machine-learning system can be trained (learned) based on historical user data to improve accuracy of the speech recognition and the identification of the at least one trigger word. The historical user data can include data characterizing previous successful and failed attempts of speech recognition and identification of trigger words.

At operation 235, electronic device 105 (or server 130) causes providing (playing) to the user at least one sound effect associated with the at least one trigger word. The sound effects can be played to the user almost instantly after the user speech. For example, the sound effect associated with the trigger word is provided to the user less than one second after receipt of the audio signal.

In certain embodiments, if the identity of the user is determined at operation 220, electronic device 105 (or server 130) can access predetermined settings associated with the identity of the user. The settings associated with the identity of the user can be further used to identify (select) the trigger words. Moreover, the sound effects associated with the trigger words can be provided (played) to the user in a manner prescribed by the settings associated with the identity of the user.

In certain additional embodiments, if at least one audio characteristic of the audio signal associated with the speech of the user is retrieved at operation 225, electronic device 105 (or server 130) can further adjust at least one audio parameter (e.g., a frequency or an amplitude) of the sound effect in accordance with the audio characteristics of the audio signal. For example, if the user spoke certain trigger words loudly, the corresponding sound effects are also played loudly. Similarly, the identification of the trigger words (as performed at operation 230) can further depend on the audio characteristic of the audio signal.

In yet other embodiments, at operation 235, electronic device 105 (or server 130) can distribute the sound effect associated with the trigger words to electronic devices 105 of other (remote) users. Alternatively, electronic device 105 (or server 130) can cause electronic devices 105 of other (remote) users to play the same sound effect associated with the trigger words. As such, these embodiments are practicable when the users are involved in the same online or network game and have online chat conversations with one another. In other words, the audio signal associated with the user can be audible to at least one second user via a multiplayer computerized game environment, and the sound effects associated with the trigger words are also provided both to the user and said at least one second user.

In some embodiments, electronic device 105 (or server 130) can substitute a portion of the audio signal, which is associated with a certain trigger word, with a corresponding sound effect such that the second user of the multiplayer computerized game environment is provided with a modified audio signal. The modified audio signal comprises a remaining part of the audio signal and the at least one sound effect being provided instead of the portion of the audio signal, which is associated with the trigger word.

Moreover, in some implementations, the operation 235 can also include providing certain visual effects associated with the trigger words.

Figure 3:
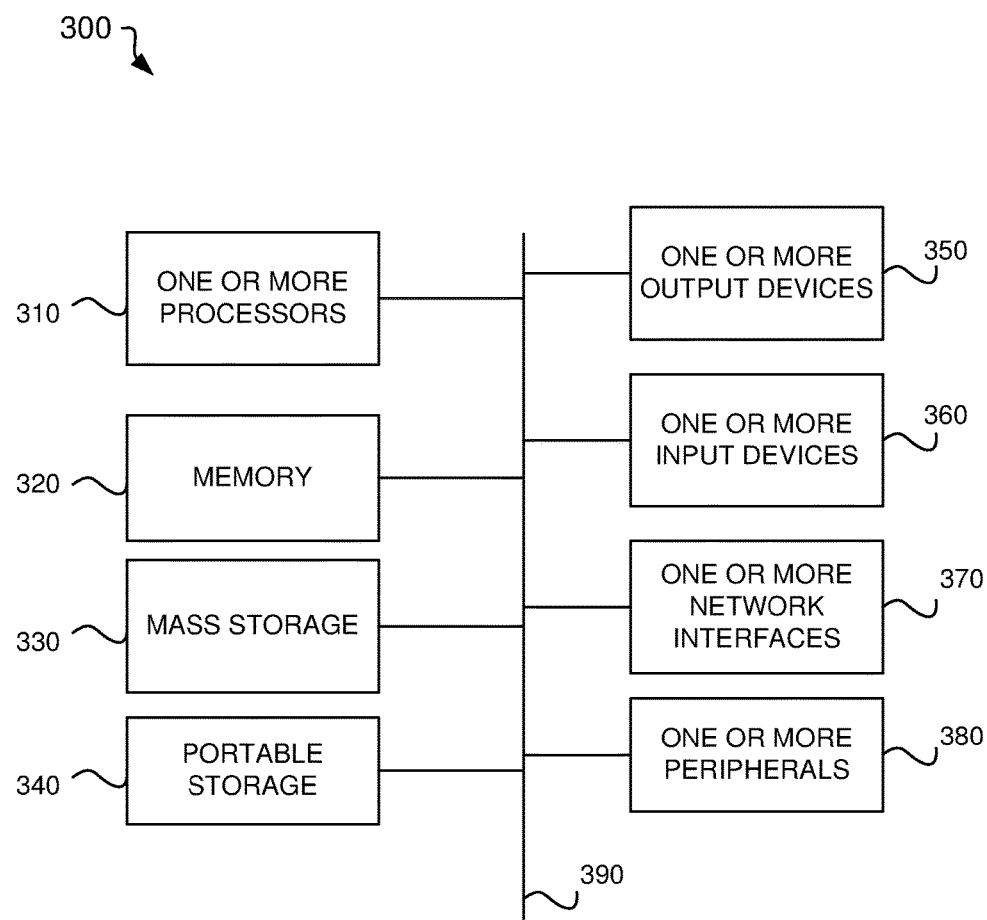
FIG. 3 shows an example computer system that can be used to implement at least some operations of a method for providing sound effects, according to an example embodiment.

FIG. 3 is a high-level block diagram illustrating a computing device 300 suitable for implementing the methods described herein. Computing device 300 may be used for implementing the methods for providing sound effects as described above. Computing device 300 may include, be, or be an integral part of one or more of a variety of types of devices, such as a mobile device, among others. In some embodiments, computing device 300 can be regarded as an instance of computing device 105.

As shown in FIG. 3, computing device 300 includes one or more processors 310, memory 320, one or more mass storage devices 330, one or more portable storage devices 340, one or more output devices 350, one or more input devices 360, one or more network interfaces 370, one or more optional peripheral devices 380, and a communication bus 390 for operatively interconnecting the above-listed elements. Processors 310 can be configured to implement functionality and/or process instructions for execution within computing device 300. For example, processors 310 may process instructions stored in memory 320 or instructions stored on storage devices 330. Such instructions may include components of an operating system or software applications.

Memory 320, according to one example, is configured to store information within computing device 300 during operation. For example, memory 320 can store trigger words and user settings associated with sound effects. Memory 320, in some example embodiments, may refer to a non-transitory computer-readable storage medium or a computer-readable storage device. In some examples, memory 320 is a temporary memory, meaning that a primary purpose of memory 320 may not be long-term storage. Memory 320 may also refer to a volatile memory, meaning that memory 320 does not maintain stored contents when memory 320 is not receiving power. Examples of volatile memories include RAM, dynamic random access memories (DRAM), static random access memories (SRAM), and other forms of volatile memories known in the art. In some examples, memory 320 is used to store program instructions for execution by processors 310. Memory 320, in one example, is used by software applications or mobile applications. Generally, software or mobile applications refer to software applications suitable for implementing at least some operations of the methods as described herein.

Mass storage devices 330 can also include one or more transitory or non-transitory computer-readable storage media or computer-readable storage devices. For example, memory 320 can store instructions for processor 310, sound effects, settings of sound effects, and so forth. In some embodiments, mass storage devices 330 may be configured to store greater amounts of information than memory 320. Mass storage devices 330 may also be configured for long-term storage of information. In some examples, mass storage devices 330 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Computing device 300 may also include one or more optional input devices 360. Input devices 360 may be configured to receive input from a player through tactile, audio, video, or biometric channels. Examples of input devices 360 may include a keyboard, keypad, mouse, trackball, touchscreen, touchpad, microphone, video camera, image sensor, fingerprint sensor, or any other device capable of detecting an input from the player or other source, and relaying the input to computing device 300 or components thereof.

Optional output devices 350 may be configured to provide output to the player through visual or auditory channels. Output devices 350 may include a video graphics adapter card, display, such as liquid crystal display (LCD) monitor, light emitting diode (LED) monitor, or organic LED monitor, sound card, speaker, headphones, headset, virtual reality headset, projector, or any other device capable of generating output that may be intelligible to a player. Output devices 350 may also include a touchscreen, presence-sensitive display, or other input/output capable displays known in the art.

Computing device 300 can also include network interface 370. Network interface 370 can be utilized to communicate with external devices via one or more communications networks such as communications network 135 or any other wired, wireless, or optical networks. Network interface 370 may be a network interface card, such as an Ethernet card, an optical transceiver, a radio frequency transceiver, or any other type of device that can send and receive information.

An operating system of computing device 300 may control one or more functionalities of computing device 300 or components thereof. For example, the operating system may interact with the software applications or mobile applications and may facilitate one or more interactions between the software/mobile applications and processors 310, memory 320, storage devices 330, input devices 360, output devices 350, and network interface 370. The operating system may interact with or be otherwise coupled to software applications or components thereof. In some embodiments, software or mobile applications may be included in the operating system.

Thus, methods and systems for providing sound effects have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for providing sound effects, the method comprising:
receiving an audio signal associated with a speech of a user;

performing speech recognition on the audio signal to identify one or more recognized words;

identifying at least one trigger word among the one or more recognized words;

determining at least one audio characteristic of the audio signal;

selecting at least one sound effect associated with the at least one trigger word based on the determined at least one audio characteristic; and providing to the user the at least one sound effect associated with the at least one trigger word.

2. The method of claim 1, in which the at least one trigger word is predetermined by the user.

3. The method of claim 1, in which the at least one trigger word is predetermined by a system administrator.

4. The method of claim 1, in which the identification of the at least one trigger word among the one or more recognized words comprises:

for each of the recognized words, dynamically searching a database for the at least one trigger word.

5. The method of claim 1, further comprising:

determining a conversational context based on the one or more recognized words, in which the identification of the at least one trigger word among the one or more recognized words further depends on the conversational context.

6. The method of claim 1, further comprising:

maintaining a machine-learning system configured to perform the speech recognition on the audio signal to identify the one or more recognized words and identify the at least one trigger word among the one or more recognized words;

obtaining historical user data associated with the user or comparable users; and training the machine-learning system based on the historical user data to improve accuracy of the speech recognition and the identification of the at least one trigger word.

7. The method of claim 6, in which the machine-learning system is further trained based on the historical user data to identify the user based on the one or more recognized words.

8. The method of claim 6, in which the machine-learning system is further trained to determine a conversational context based on the one or more recognized words.

9. The method of claim 1, in which the at least one sound effect associated with the at least one trigger word is provided to the user less than one second after receipt of the audio signal.

10. The method of claim 1, further comprising:

performing voice recognition on the audio signal to determine identity of the user, in which the user is one of a plurality of users;

accessing predetermined settings associated with the identity of the user, in which the identification of the at least one trigger word among the one or more recognized words is further based on the settings associated with the identity of the user; and providing to the user at least one sound effect associated with the at least one trigger word in a manner prescribed by the settings associated with the identity of the user.

11. The method of claim 1, in which the audio signal associated with the user is received within a multiplayer computerized game environment, in which:

the user and at least one second user are players within the multiplayer computerized game environment, the audio signal associated with the user is audible to the at least one second user via the multiplayer computerized game environment; and the at least one sound effect associated with the at least one trigger word is provided to the user and to the at least one second user of the multiplayer computerized game environment.

12. The method of claim 11, further comprising:

substituting a portion of the audio signal, which is associated with the at least one trigger word, with the at least one sound effect such that the at least one second user of the multiplayer computerized game environment is provided with a modified audio signal, the modified audio signal comprising a remaining part of the audio signal and the at least one sound effect appearing instead of the portion of the audio signal, which is associated with the at least one trigger word.

13. The method of claim 1, further comprising:

adjusting at least one audio parameter of the at least one sound effect in accordance with the at least one audio characteristic of the audio signal.

14. The method of claim 13, in which the at least one audio characteristic of the audio signal includes a tonality or a loudness of the speech of the user.

15. The method of claim 13, in which the at least one audio parameter of the sound effect includes a frequency or an amplitude.

16. The method of claim 1, wherein the identifying of the at least one trigger word among the one or more recognized words further depends on the at least one audio characteristic of the audio signal.

17. The method of claim 1, further comprising:

causing at least one electronic device of a second user to play the at least one sound effect associated with the at least one trigger word.

18. The method of claim 1, in which the at least one sound effect further includes at least one visual effect.

19. A system for providing sound effects, the system comprising at least one processor and a memory storing processor-executable codes, in which the at least one processor is configured to implement the following operations upon executing the processor-executable codes:

receiving an audio signal associated with a speech of a user;

performing speech recognition on the audio signal to identify one or more recognized words;

identifying at least one trigger word among the one or more recognized words;

determining at least one audio characteristic of the audio signal;

selecting at least one sound effect associated with the at least one trigger word based on the determined at least one audio characteristic; and providing to the user the at least one sound effect associated with the at least one trigger word.

20. A non-transitory processor-readable medium having instructions stored thereon, which when executed by one or more processors, cause the one or more processors to implement a method for providing sound effects, the method comprising:

receiving an audio signal associated with a speech of a user;

performing speech recognition on the audio signal to identify one or more recognized words;

identifying at least one trigger word among the one or more recognized words;

determining at least one audio characteristic of the audio signal;
selecting at least one sound effect associated with the at least one trigger word based on the determined at least one audio characteristic; and
providing to the user the at least one sound effect associated with the at least one trigger word.

\* \* \* \* \*